(12) United States Patent
Tummala

(10) Patent No.: US 9,967,337 B1
(45) Date of Patent: May 8, 2018

(54) CORRUPTION-RESISTANT BACKUP POLICY

(71) Applicant: EMC Corporation, Hopkinton, MA (US)

(72) Inventor: Himabindu Tummala, South Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 198 days.

(21) Appl. No.: 14/982,597

(22) Filed: Dec. 29, 2015

(51) Int. Cl.
*G06F 17/30* (2006.01)
*H04L 29/08* (2006.01)

(52) U.S. Cl.
CPC ...... *H04L 67/1095* (2013.01); *H04L 67/1097* (2013.01)

(58) Field of Classification Search
CPC ............. H04L 67/1095; H04L 67/1097; G06F 2201/84; G06F 11/1469
See application file for complete search history.

(56) References Cited

U.S. PATENT DOCUMENTS

| | | | |
|---|---|---|---|
| 6,141,773 A * | 10/2000 | St. Pierre | G06F 11/1451 711/162 |
| 6,920,537 B2 * | 7/2005 | Ofek | G06F 11/1458 707/999.202 |
| 7,155,463 B1 | 12/2006 | Wang et al. | |
| 7,290,017 B1 | 10/2007 | Wang et al. | |
| 7,487,310 B1 | 2/2009 | Bingham et al. | |
| 7,681,069 B1 | 3/2010 | Chellappa et al. | |
| 7,797,483 B1 * | 9/2010 | Suryanarayanan | G06F 11/1458 711/100 |
| 8,042,172 B1 * | 10/2011 | Heithcock | G06F 11/1466 707/674 |
| 8,126,854 B1 * | 2/2012 | Sreedharan | G06F 11/1446 707/693 |
| 8,140,484 B2 | 3/2012 | Blitzer et al. | |
| 8,185,505 B1 | 5/2012 | Blitzer et al. | |
| 8,244,792 B2 | 8/2012 | Boaz et al. | |
| 8,600,952 B2 | 12/2013 | Blitzer et al. | |
| 8,615,641 B2 * | 12/2013 | Sampathkumar | G06F 11/1458 711/162 |
| 9,152,504 B1 * | 10/2015 | Bushman | G06F 11/1451 |
| 9,268,659 B2 * | 2/2016 | Kapoor | G06F 11/1458 |
| 9,367,401 B2 | 6/2016 | Bushman | |

(Continued)

*Primary Examiner* — Alina A Boutah
(74) *Attorney, Agent, or Firm* — BainwoodHuang

(57) ABSTRACT

Improved techniques for managing backups of data objects involve specifying a policy for generating complete versions of a data object at a destination data storage system (destination) from differential backups of the data object previously received. The complete versions are independent of the previous differential backups and any complete versions of the data object that preceded them. A backup policy specifies when such a complete version is to be generated. Along these lines, a destination receives differential backups of a data object stored on a source. The destination may store these differential backups at the destination. However, according to the backup policy that specifies that a complete version of a data object is generated after the destination receives a certain number of differential backups, the destination creates a complete copy of the data of the data object at new storage locations at the destination distinct from previous storage locations.

20 Claims, 4 Drawing Sheets

(56) References Cited

U.S. PATENT DOCUMENTS

| | | | | |
|---|---|---|---|---|
| 9,665,307 B1* | 5/2017 | LeCrone | | G06F 3/065 |
| 9,753,672 B1* | 9/2017 | Bachu | | G06F 3/065 |
| 2007/0094467 A1* | 4/2007 | Yamasaki | | G06F 11/2082 |
| | | | | 711/162 |
| 2007/0101070 A1* | 5/2007 | Matsunami | | G06F 3/0605 |
| | | | | 711/147 |
| 2007/0271426 A1* | 11/2007 | Watanabe | | G06F 11/1466 |
| | | | | 711/159 |
| 2009/0077134 A1* | 3/2009 | Ueoka | | G06F 11/1662 |
| 2011/0202735 A1* | 8/2011 | Kono | | G06F 11/1451 |
| | | | | 711/162 |
| 2011/0231580 A1* | 9/2011 | Nakamichi | | G06F 3/0605 |
| | | | | 710/9 |
| 2012/0084524 A1* | 4/2012 | Gokhale | | G06F 17/30466 |
| | | | | 711/162 |
| 2012/0136832 A1* | 5/2012 | Sadhwani | | G06F 11/1469 |
| | | | | 707/640 |
| 2012/0203742 A1* | 8/2012 | Goodman | | G06F 11/1451 |
| | | | | 707/646 |
| 2013/0166862 A1* | 6/2013 | Huang | | G06F 11/1451 |
| | | | | 711/162 |
| 2013/0262925 A1* | 10/2013 | Dhanalakoti | | G06F 11/1415 |
| | | | | 714/16 |
| 2014/0214766 A1* | 7/2014 | Kato | | G06F 11/1451 |
| | | | | 707/640 |
| 2016/0041880 A1* | 2/2016 | Mitkar | | G06F 11/1412 |
| | | | | 707/680 |
| 2016/0092311 A1* | 3/2016 | Bushman | | G06F 11/1446 |
| | | | | 707/646 |
| 2016/0132400 A1* | 5/2016 | Pawar | | G06F 11/1458 |
| | | | | 707/679 |
| 2016/0179419 A1* | 6/2016 | Yamaguchi | | G06F 3/0619 |
| | | | | 711/162 |
| 2016/0197997 A1* | 7/2016 | Fossen | | H04L 67/1097 |
| | | | | 709/219 |
| 2017/0168903 A1* | 6/2017 | Dornemann | | G06F 11/1469 |

* cited by examiner

CORRUPTION-RESISTANT BACKUP POLICY

BACKGROUND

Data storage systems are arrangements of hardware and software that include storage processors coupled to arrays of non-volatile storage devices. In typical operation, storage processors service storage requests that arrive from client machines, or hosts. The storage requests specify data objects (e.g., file systems, LUNs, vVols, and the like) to be accessed, overwritten, created, or deleted, for example. The storage processors run software that manages incoming storage requests and performs various data processing tasks to organize and secure the data stored on the non-volatile storage devices.

Data storage systems may provide facilities for backing up data objects. A data storage system may back up data objects on a local storage facility within that data storage system. Alternatively, a data storage system may back up data objects on a remote storage facility within another data storage system.

SUMMARY

Unfortunately, there are deficiencies with the above-described backup solutions. For example, to maintain backups of a data object at a remote storage facility, a local storage facility may transmit differential backups to the remote storage facility to update a version of the data object maintained at the remote storage facility. As is known, differential backups provide changes relative to previous backups instead of providing entire fresh versions of the objects. Transferring differential backups is far more efficient in terms of resource consumption than is transferring full backups. However, a consequence of transferring differential backups is that the differential backups and the original object may all share much of the same data. Accordingly, corruption in even a small amount of shared data may affect many if not all backups, as they all may share the same corrupted data. In these cases, irretrievable data loss may occur if no other copy of the data object is available.

In contrast with the above-described conventional approach, improved techniques for managing backups of data objects involve specifying a policy for generating complete versions of a data object at a destination data storage system (destination) from differential backups of the data object previously received. The complete versions are independent of the previous differential backups and any complete versions of the data object that preceded them. A backup policy specifies when such a complete version is to be generated.

For example, a backup policy may specify that a complete version of a data object be generated after the destination receives a certain number of differential backups. Other backup policies may specify that a complete version of the data object is generated after a certain amount of time has passed, or in response to some other predetermined event. For example, a destination receives differential backups of a data object stored on a source. The destination may store these differential backups at the destination. However, according to the backup policy which specifies that a complete version of a data object be generated after the destination receives a certain number of differential backups, the destination creates a complete copy of the data of the data object at new storage locations at the destination distinct from previous storage locations. The destination then stores data from subsequent differential backups at the new storage locations.

Advantageously, the improved techniques limit the impact of corrupted data to those backups received since the last full copy prior to the corruption was made. Thus, the destination and/or source may restore from an earlier, uncorrupted version of a data object.

One embodiment of the improved techniques is directed to a method of managing backups of data objects. The method includes receiving, by a destination data storage system (destination) from a source data storage system (source), a differential backup of a data object stored in the source, the differential backup containing data indicative of changes in the data object made since a previous differential backup was made. The method also includes applying the changes in the data object to a version of the data object at the destination to update the version of the data object, data of the updated version of the data object being stored in first storage locations of the destination. The method further includes, in accordance with a backup policy in place at the destination, copying, by the destination, the data of the updated version of the data object to second storage locations of the destination distinct from the first storage locations.

Additionally, some embodiments are directed to a system constructed and arranged to manage backups of data objects. The system includes a source data storage system (source) and a destination data storage system (destination), each including memory and controlling circuitry coupled to the memory. The controlling circuitry of the destination is constructed and arranged to manage backups of data objects.

Further, some embodiments are directed to a computer program product having a non-transitory, computer-readable storage medium that stores executable code, which, when executed by a data storage system, causes the data storage system to perform a method of managing backups of data objects.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques for managing backups of data objects involve specifying a policy for generating complete versions of a data object at a destination data storage system from differential backups of the data object previously received. The complete versions are independent of the previous differential backups and any complete versions of the data object that preceded them. Advantageously, the improved techniques limit the impact of corrupted data.

Figure 1:
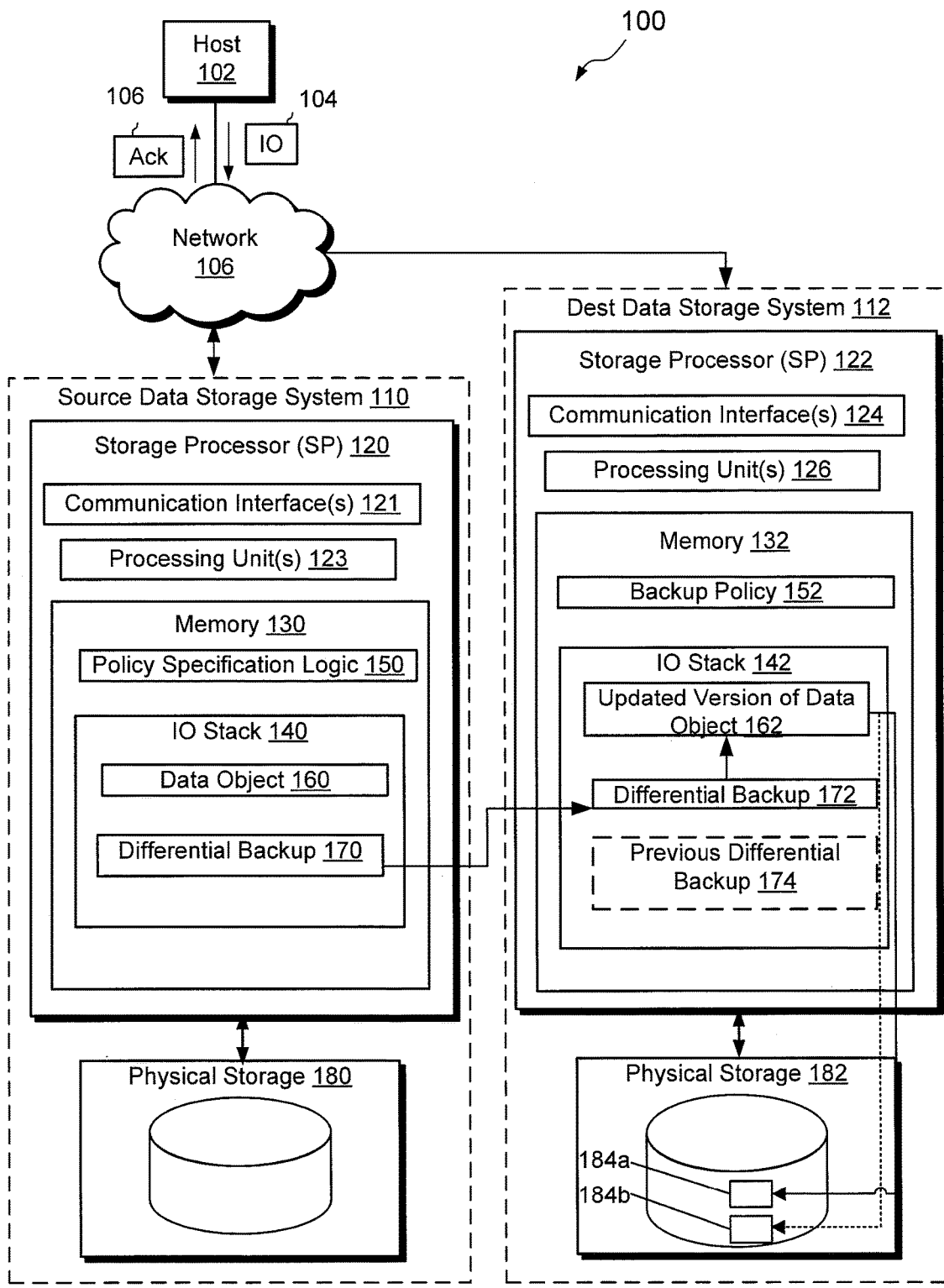
FIG. 1 is a block diagram illustrating an example electronic environment in which the improved technique can be carried out.

FIG. 1 shows an example electronic environment 100 in which embodiments of the improved techniques hereof can be practiced. Here, a host computing device ("host") 102 accesses a source data storage system 110 ("source") over a network 106. Further, a destination data storage system 112 ("destination") provides a remote backup facility for the source 110. The source 110 is seen to be in communication with the destination 112 over the network 106. As shown in FIG. 1, the destination 112 is structured similarly to the source 110, although the source 110 and destination 112 may differ in their respective details.

The source 110 and destination 112 include a respective storage processor, or "SP," 120 and 122 and non-volatile physical storage 180 and 182. The physical storage 180 and 182 is provided, for example, in the form of magnetic disk drives, optical drives, and/or electronic flash drives, including combinations thereof, such as RAID (Redundant Array of Independent (or Inexpensive) Disks). The source 110 and destination 112 each may include multiple SPs. In an example, multiple SPs may be provided in each system as circuit board assemblies, or "blades," which plug into a chassis that encloses and cools the SPs. The chassis in each system has a backplane for interconnecting the SPs, and additional connections may be made among SPs using cables. It is understood, however, that no particular hardware configuration is required, as any number of SPs (including a single one in each system) can be provided and the SPs 120 and 122 can be any type of computing device capable of processing host IOs.

The network 106 can be any type of network or combination of networks, such as a storage area network (SAN), local area network (LAN), wide area network (WAN), the Internet, and/or some other type of network, for example. In an example, the host 102 can connect to the SPs 120 and 122 using various technologies, such as Fibre Channel (e.g., through a SAN), iSCSI, NFS, SMB 3.0, and CIFS. Any number of hosts 102 may be provided, using any of the above protocols, some subset thereof, or other protocols besides those shown. The SP 120 is configured to receive IO request 104 and to respond to such IO requests 104 by reading and/or writing the non-volatile storage 180 and sending an acknowledgment 108.

The SP 120 is seen to include one or more communication interfaces 121, a set of processing units 123, and memory 130. The communication interface 121 includes, for example, SCSI target adapters and network interface adapters, for converting electronic and/or optical signals received from the network 106 to electronic form for use by the SP 120. The set of processing units 123 includes one or more processing chips and/or assemblies. In a particular example, the set of processing units 123 includes numerous multi-core CPUs. The memory 130 includes both volatile memory (e.g., RAM), and non-volatile memory, such as one or more ROMs, disk drives, solid state drives, and the like.

The SP 122 is arranged similarly to the SP 120 and is seen to include one or more communication interfaces 124, a set of processing units 126, and memory 132. The communication interface 124 includes, for example, SCSI target adapters and network interface adapters, for converting electronic and/or optical signals received from the network 106 to electronic form for use by the SP 122. The set of processing units 126 includes one or more processing chips and/or assemblies. In a particular example, the set of processing units 126 includes numerous multi-core CPUs. The memory 132 includes both volatile memory (e.g., RAM), and non-volatile memory, such as one or more ROMs, disk drives, solid state drives, and the like.

The set of processing units 126 and the memory device 132 together form control circuitry, which is constructed and arranged to carry out various methods and functions as described herein. Also, the memory 130 and 132 each include a variety of software constructs realized in the form of executable instructions. When the executable instructions are run by the respective sets of processing units 123 and 126, those sets of processing units 124 and 126 are caused to carry out the operations of the software constructs. Although certain software constructs are specifically shown and described, it is understood that the memory 130 and 132 typically include many other software constructs, which are not shown, such as an operating system, various applications, processes, and daemons, for example.

The memory 130 is seen to include (i.e., realize by operation of programming code) an IO stack 140 and policy specification logic 150. The IO stack 140 provides an execution path for host IOs (e.g., IO request 104). The policy specification logic 150 is a software construct configured to cause SP 120 to carry out policy specification operations. Also, the memory device 132 is seen to include an IO stack 142 and a backup policy 152. Typically, the backup policy 152 is provided to the destination 112 by the policy specification logic 150 at the source, although this is by no means a requirement.

The IO stack 140 on the source 110 includes a data object 160, e.g., a file system, a LUN, a vVol, or the like. It should be understood that the data object 160 is a logical construct within the IO stack 140 and that the underlying data and metadata that support this structure typically reside in the storage 180. Although only a single data object 160 is shown, it should be understood that SP 120 may host any number of data objects, like the data object 160, and their associated snaps, for example.

The IO stack 142 on the destination 112 includes a version of the data object 162 that is reasonably current. Along these lines, at some initial time, the source 110 transmits a version 162 of the data object 160 ("data object 162") to the destination 112 in full. The data object 162 is a copy of the data object 160 at a point in time. The destination 112 allocates storage space 184a in the storage 182 to store the data of the data object 162 and then stores the data in the allocated storage space. Over time, as the data object 160 is modified by subsequent writes, the source 110 sends updates of the data object 160 to the destination 112, e.g., according to the backup policy 152.

To minimize processing, storage, and networking resources, source 110 communicates updates to the data object 160 in the form of a differential backup 170 to the destination 112. The differential backup 170 contains data indicative of changes in the data object 160 made since a previous differential backup 174 was made. In this way, upon receiving the differential backup 170, the destination 112 may store the differential backup 170 as a standalone differential backup 172 or may use the differential backup 170 to directly update the data object 162.

It should be understood that differential backups 172 may share data with the data object 162 and any previous differential backups, e.g., previous differential backup 174 on the destination 112. While this has great benefits in terms of memory savings, there is a risk that a differential backup 172 will contain newly corrupted data from the data object 160. In this case, all subsequent backups depending on this differential backup would share the corrupted data.

Along these lines, the backup policy 152 provides protection against the effects of corrupted data by specifying that independent versions of the data object 162 be created periodically. In an example, the backup policy 152 is a document, e.g., a file, a script, or the like, containing information indicating a time or set of events at which the destination 112 creates independent versions of the data object 162. For example, in one arrangement, the backup policy 152 may specify that the destination 112 create an independent version of the data object 162 after receiving a specified number of differential backups. In another arrangement, the backup policy 152 may specify that the destination 112 create an independent version of the data object 162 after a specified amount of time has passed since the most recent independent version was created.

During an example operation, SP 122 receives the backup policy 152 from the source 110. In this example, the policy specification logic 150 at the source 110 generates the backup policy 152. The source 110 then transmits the backup policy 152 to the destination 112 via the network 106. After receiving the backup policy 152, the destination 112 stores the backup policy 152 in the memory device 132 for subsequent reference. It will be assumed for the sake of this example that the backup policy 152 specifies that the destination 112 create an independent version of the data object 162 after receiving a specified number of differential backups.

At some point after receiving the backup policy 152, the source 110 transmits a differential backup 170 of the data object 160 to the destination 112. Upon receipt of the differential backup 170, the destination 112 applies the changes specified in the differential backup 170 to update the version of the data object 162. In the example to follow, the destination stores the received differential backup 170 along with previous differential backups 174. For example, the destination 112 may create snaps of the data object 162 from the differential changes 170. However, as an alternative, the destination 112 may add the changes to the data object 162 to create an updated version directly.

At this point, it should be understood that the updated version of the data object 162 and/or the differential backup 172 and the previous differential backup 174 may all store their data in first locations 184a in the physical storage 182. The first locations 184a refer to any locations in the physical storage 182, and those locations need not be contiguous. In a particular example, the first locations 184a refer to block locations, i.e., locations of "blocks," where a block is an allocation unit of storage from the physical storage 182. In an example, the data object 162 may be supported by a sequential array of block pointers, with each block pointer pointing to a respective block of storage in the first storage locations 184a. The block pointers enable the blocks of the data object 162 to be located and arranged in their proper order.

When the backup policy 152 specifies that the destination 112 make an independent version of the data object 162, the destination 112 copies the data of the data object 162 to second locations 184b in the storage 182, where the second locations 184b are distinct from the first locations 184a. It should be emphasized that this is a copy rather than a move of data from first locations 184a to second locations 184b. After copying, there are two versions of the data of object 162—a first version in first locations 184a and a second version in second locations 184b. Further details of this copying process are shown in connection with FIG. 2.

Figure 2:
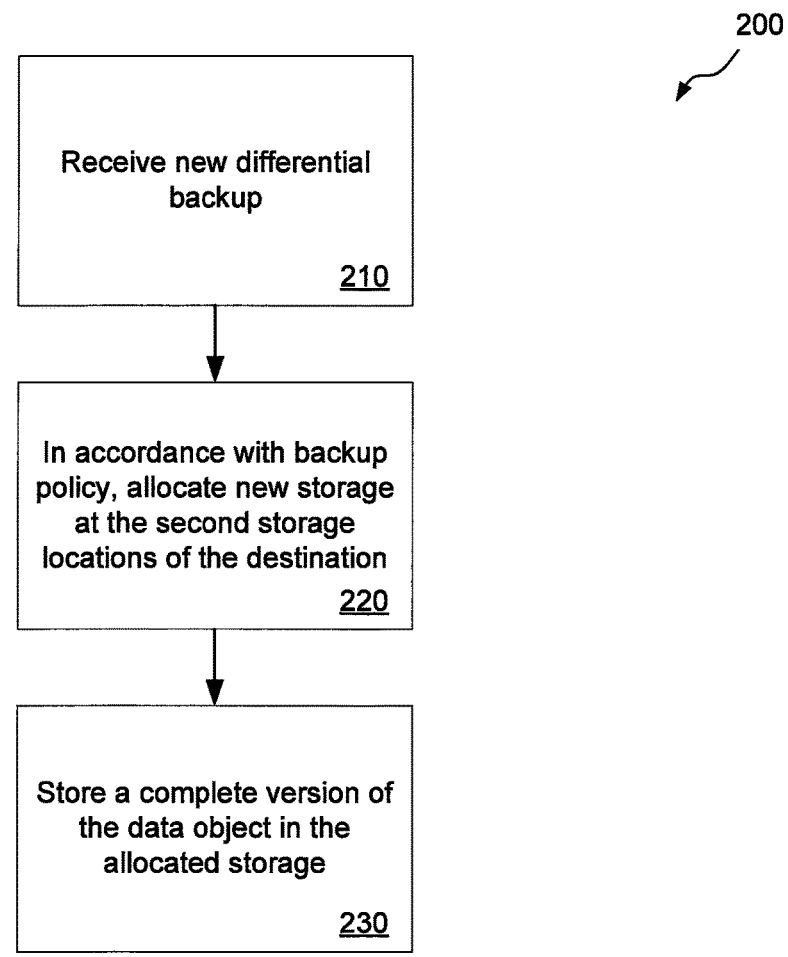
FIG. 2 is a flow chart illustrating an example update operation in the electronic environment of FIG. 1.

FIG. 2 shows an example process 200 of providing an independent copy of the data object 162 at the destination. Again, in this example, it is assumed that the backup policy 152 specifies that the destination 116 make an independent copy of the data source 162 upon the receipt of a particular number of differential backups. In the process 200 at 210, the destination 112 receives a new differential backup 170. By checking against the backup policy 152, the destination 112 determines that it needs to create an independent copy of the data object 162 upon receipt of the new differential backup 170.

At 220, in accordance with the backup policy 152, the destination 112 allocates new storage in the storage device 182 at the second locations 184b.

At 230, the destination 112 copies the data of the data object 162 in the first locations 184a to the newly allocated locations 184b. For example, if the data are stored in blocks in the storage 182, then the destination copies the data from blocks at the first locations 184a to blocks at the second locations 184b. In some examples, upon performing the copy, the destination 112 adjusts the data object 162 so that any read operation performed on the updated data object 162 will be directed to the copied data at the second locations 184b rather than at the first locations 184a. For example, when the data object 162 is supported by a sequential array of block pointers, the destination 112 redirects those block pointers to point to the second locations 184b. It should be understood that that allocation described at 220 need not run to completion before the storing at 230 begins. Rather, storage may be allocated and data may be copied to the newly allocated storage in any suitable order.

One way to effect the copy of the data of the data object 162 from the first storage locations 184a to the second storage locations 184b is to force a write split on each of the sequential array of block pointers. Along these lines, upon initiating the creation of the independent copy of the data object 162, the destination 112 reads from a block of data at a first location 184a. Using the data it just read, the destination 112 then performs a write to that block of data using the exact same data stored in the block. The effect of this write is to redirect the block pointer. By issuing the write command, the destination 112 writes the "new" data (which is exactly the same data it just read and is currently in that block) in a block in a second location 184b as part of the copy operation. As part of the write splitting, the destination 112 then redirects the block pointer that pointed to a first storage location 184a to point to the second storage location 184b. By repeating over every block that stores the data of the data object 162, the destination 112 is able to perform the independent copy and redirect all of the block pointers to the second storage locations 184b.

Figure 3:
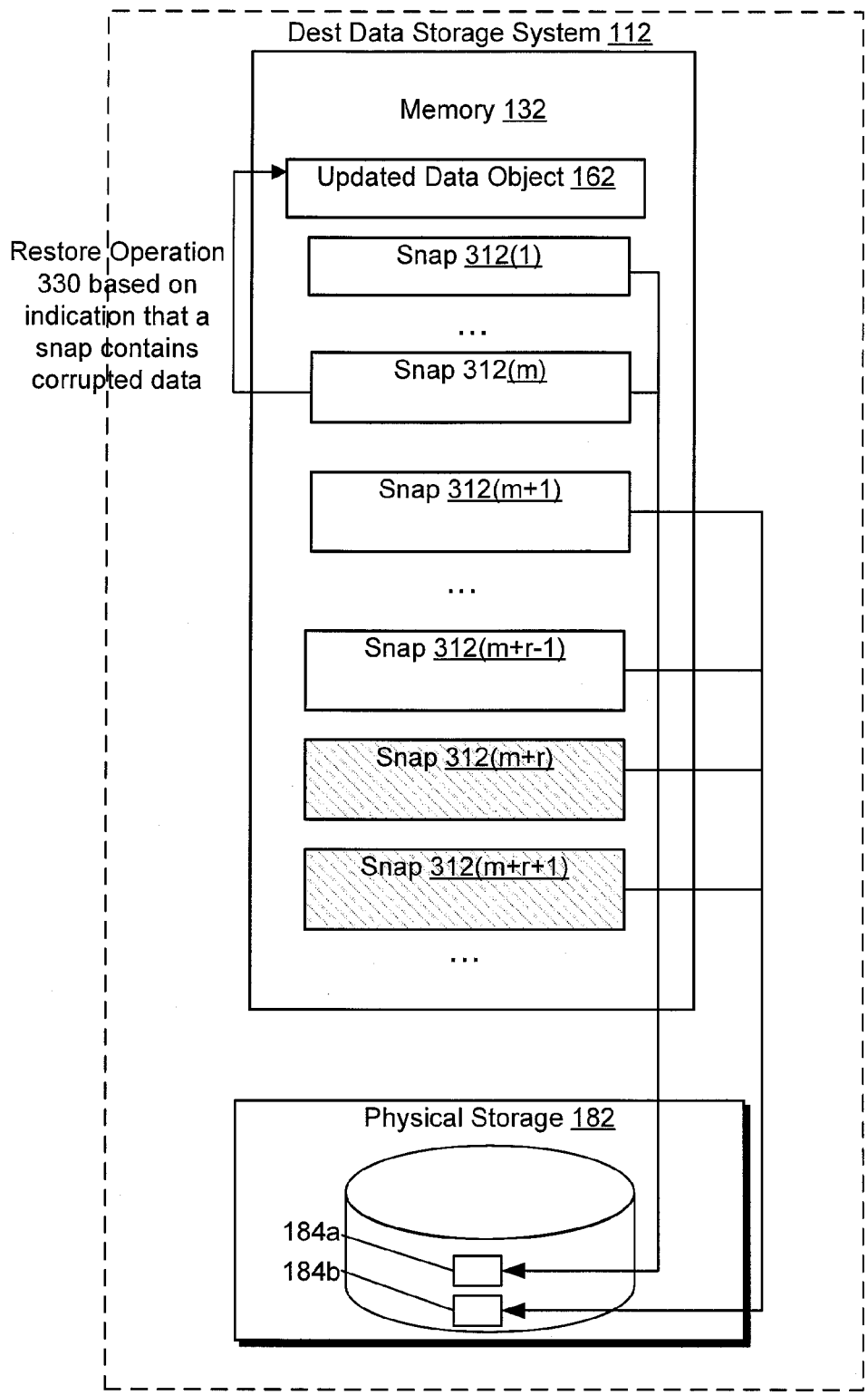
FIG. 3 is a block diagram illustrating an example restore operation in the electronic environment of FIG. 1.

FIG. 3 shows an example configuration of the destination 112. In this example, the destination 112 stores the data object 162 as well as a number of snaps 312(1), . . . , 312(m), 312(m+1), . . . , 312(m+r−1), 312(m+r), 312(m+r+1) of the data object 162. The snaps 312(1), . . . , 312(m+r) are created by the destination from a sequence of differential backups 172. For example, suppose that snap 312(m) is the most recent snap of the data object 162 when the destination 112 receives a differential backup 170. The destination 112 creates the new snap 312(m+1) by applying the changes in the differential backup 170 to the snap 312(m).

In this configuration, the backup policy 152 specifies that the destination 112 is to create an independent copy of the data object 162 after receiving m differential backups 172 (1), 172(2), . . . , 172(m). Upon receiving each of the differential backups 172, the destination 112 applies the differential backup to the data object 162 and creates a corresponding snap 312(1), . . . , 312(m) of the data object 162. In an example, each of the snaps 312(1), . . . , 312(m) is supported by a sequential array of block pointers that point to the first storage locations 184a. It should be understood that each of the snaps 312(1), . . . , 312(*m*) will have some block pointers different from block pointers in other snaps 312. However, the block pointers that are common to the snaps 312 represent the shared blocks of data in the storage device 182.

According to the backup policy 152, the destination creates an independent copy of the data object 162 upon receiving that last differential backup 172. After performing the copy, as explained above, the data object 162 is now supported by the sequential array of block pointers that point to the second storage locations 184*b*.

Now, upon receipt of the next differential backup 172, the destination 112 creates snap 112(*m*+1) as described above. However, now the snap 312(*m*+1) and subsequent snaps are supported by a sequential array of block pointers that point to the second storage locations 184*b*, whereas the snaps 312(1), . . . , 312(*m*) are each supported by a sequential array of block pointers that point to the first storage locations 184*a*.

Suppose that one of the subsequent differential backups 172 has corrupted data that causes the snap 312(*m*+r) to be corrupted. (This corruption is represented by the hashing marks in the snap shown in FIG. 3.) Because the corrupted data may be shared among all subsequent snaps, all subsequent backups will be corrupted. However, because the snaps 312(1), . . . , 312(*m*) are each supported by the first storage locations 184*a*, the corrupted data does not affect these snaps. Further, corruption in snaps 312(1), . . . , 312(*m*) won't affect later snaps as long as the corruption arises after the fresh copy of the data object 162 is made.

Accordingly, suppose further that the destination receives a restore command, e.g., in response to the detection of the corrupted data or via the source 110 from the host 102. In the example shown in FIG. 3, the destination 112, in response to the restore command, restores the data object 162 from the snap 312(*m*)—the latest snap from those that are supported by the first storage locations 184*a*. However, in other arrangements, the destination 112 may restore from the most recent uncorrupted snap, in this case snap 312(*m*+r−1).

Figure 4:
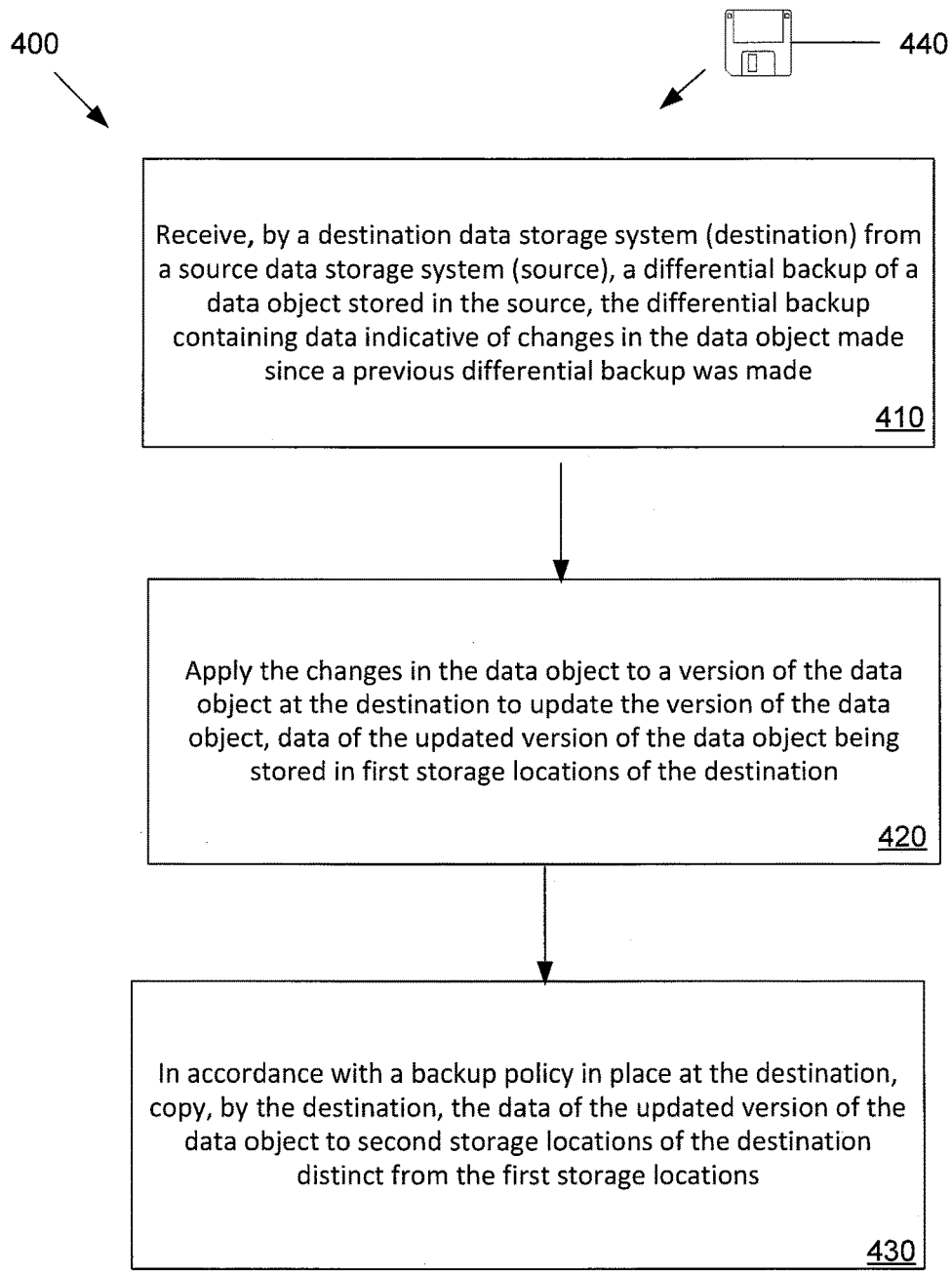
FIG. 4 is a flow chart illustrating a method of carrying out the improved technique in the electronic environment of FIG. 1.

FIG. 4 illustrates a method 400 of managing backups of data objects. The method 400 may be performed by the software constructs described in connection with FIG. 1, which reside in the memory 132 of the destination 112 and are run by the processing units 126.

At 410, a destination data storage system (destination) receives a differential backup of a data object stored in a source data storage system (source) from the source, the differential backup containing data indicative of changes in the data object made since a previous differential backup was made. For example, the destination 112 may receive a differential backup 170 based on changes made to the data object 160 on the source 110 since a previous differential backup was received.

At 420, the destination applies the changes in the data object to a version of the data object at the destination to update the version of the data object, data of the updated version of the data object being stored in first storage locations of the destination. For example, the destination 112 may create a snaps 312(*m*) based on the data object 162 and previous snaps 312(1), . . . , 312(*m*−1).

At 430, in accordance with a backup policy in place at the destination, the destination copies the data of the updated version of the data object to second storage locations of the destination distinct from the first storage locations. For example, the destination 112 may perform a write split on blocks of data at the first storage location 184*a* by simply reading the data and rewriting in back in the exact same locations. The destination 112 may then redirect the block pointers supporting the data object 162 to blocks in the second storage location 184*b*.

Improved techniques for managing backups of data objects have been described, which involve specifying a policy for generating, on a predetermined basis, complete versions of a data object at a destination data storage system (destination) from differential backups of the data object previously received. The complete versions are independent of the previous differential backups and any full versions of the data object that preceded them. Advantageously, the improved techniques limit the impact of corrupted data.

Having described certain embodiments, numerous alternate embodiments or variations can be made. For example, while the discussion above centered around data objects stored on the destination 112, the discussion could be extended to data objects on both the source 110 and destination 112.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 440 in FIG. 4). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of managing backups of data objects, the method comprising:

receiving, by a destination data storage system (destination) from a source data storage system (source), a differential backup of a data object stored in the source, the differential backup containing data indicative of changes in the data object made since a previous differential backup was made;

applying the changes in the data object to a version of the data object at the destination to update the version of the data object, data of the updated version of the data object being stored in first storage locations of the destination; and in accordance with a backup policy in place at the destination, copying, by the destination, the data of the updated version of the data object to second storage locations of the destination distinct from the first storage locations.

2. A method as in claim 1, further comprising receiving the backup policy from the source.

3. A method as in claim 1, wherein the backup policy in place at the destination specifies that copying the data of the data object to distinct storage locations of the destination is to be performed after each receipt of a predetermined number of differential backups.

4. A method as in claim 3, further comprising:
prior to copying the data and in accordance with the backup policy, allocating new storage at the second storage locations of the destination,
wherein copying the data includes storing a complete version of the data object in the allocated storage.

5. A method as in claim 4, wherein the data object is supported on the destination by a sequential array of block pointers, each block pointer pointing to a respective block of storage in the first storage locations;
wherein allocating distinct storage at the second storage locations of the destination includes allocating blocks of storage at the second storage locations; and
wherein the method further comprises redirecting the sequential array of block pointers to point to the allocated blocks at the second storage locations.

6. A method as in claim 5, wherein the acts of allocating the blocks of storage and redirecting the sequential array of block pointers are performed in response to reading the data stored in the blocks of storage at the first storage locations and writing the same data to induce a write split.

7. A method as in claim 6, wherein snaps of the data object that were generated by previous differential backups of the data object are supported by respective sequential arrays of block pointers;
wherein the method further comprises, after copying the data of the updated version of the data object to the second storage locations of the destination:
receiving a new differential backup of the data object stored in the source; and
in response to receiving the new differential backup of the data object, generating a new snap of the updated version of the data object based on the new differential backup, the new snap being supported by a sequential array of block pointers, at least one of the sequential array of block pointers supporting the new snap pointing to the blocks at the second storage locations.

8. A method as in claim 7, wherein the new differential backup received at the destination contains corrupted data; and
wherein the method further comprises:
restoring the data object from a snap of the data object that is supported by the first storage location.

9. A computer program product including non-transitory, computer-readable storage media which stores executable code, which when executed by a destination data storage system (destination), causes the destination to perform a method of managing backups of data objects, the method comprising:
receiving, by the destination from a source data storage system (source), a differential backup of a data object stored in the source, the differential backup containing data indicative of changes in the data object made since a previous differential backup was made;
applying the changes in the data object to a version of the data object at the destination to update the version of the data object, data of the updated version of the data object being stored in first storage locations of the destination; and
in accordance with a backup policy in place at the destination, copying, by the destination, the data of the updated version of the data object to second storage locations of the destination distinct from the first storage locations.

10. A computer program product as in claim 9, wherein the method further comprises receiving the backup policy from the source.

11. A computer program product as in claim 9, wherein the backup policy in place at the destination specifies that copying the data of the data object to new and distinct storage locations of the destination is to be performed after each receipt of a predetermined number of differential backups.

12. A computer program product as in claim 11, wherein the method further comprises:
prior to copying the data and in accordance with the backup policy, allocating new storage at the second storage locations of the destination; and
storing a complete version of the data object in the allocated storage.

13. A computer program product as in claim 12, wherein the data object is supported on the destination by a sequential array of block pointers, each block pointer pointing to a respective block of storage in the first storage locations;
wherein allocating the new storage at the second storage locations of the destination includes allocating blocks of storage at the second storage locations; and
wherein copying the data of the updated version of the data object to the second storage locations of the destination includes redirecting the sequential array of block pointers to point to newly allocated blocks at the second storage locations.

14. A computer program product as in claim 13, wherein the acts of allocating the blocks of storage and redirecting the sequential array of block pointers are in response to reading and subsequent writing operations performed on the data stored in the blocks of storage at the first storage locations.

15. A computer program product as in claim 14, wherein snaps of the data object that were generated by previous differential backups of the data object are supported by respective sequential arrays of block pointers;
wherein the method further comprises, after copying the data of the updated version of the data object to the second storage locations of the destination:
receiving a new differential backup of the data object stored in the source; and
in response to receiving the new differential backup of the data object, generating a new snap of the updated version of the data object based on the new differential backup, the new snap being supported by a sequential array of block pointers, at least one of the sequential array of block pointers supporting the new snap pointing to the blocks at the second storage locations.

16. A computer program product as in claim 15, wherein the new differential backup received at the destination contains corrupted data; and
wherein the method further comprises:
receiving an indication that the new differential backup contains corrupted data; and in response to the indication, restoring the data object from a most recent snap of the data object that is supported by a sequential array of block pointers pointing to blocks at the first storage location.

17. A system constructed and arranged to manage backups of data objects, the system including:
a destination data storage system (destination); and
a source data storage system (source),
the destination being constructed and arranged to:
receive, from a differential backup of a data object stored in the source, the differential backup containing data indicative of changes in the data object made since a previous differential backup was made;
apply the changes in the data object to a version of the data object at the destination to update the version of the data object, data of the updated version of the data object being stored in first storage locations of the destination; and
in accordance with a backup policy in place at the destination, copy the data of the updated version of the data object to second storage locations of the destination distinct from the first storage locations.

18. A system as in claim 17, wherein the destination is further constructed and arranged to receive the backup policy from the source.

19. A system as in claim 17, wherein the backup policy in place at the destination specifies that copying the data of the data object to new and distinct storage locations of the destination is to be performed after each receipt of a pre-determined number of differential backups.

20. A system as in claim 19, wherein the destination is further constructed and arranged to:
prior to copying the data and in accordance with the backup policy, allocate new storage at the second storage locations of the destination; and
store a complete version of the data object in the allocated storage.

* * * * *